(12) United States Patent
Todasco et al.

(10) Patent No.: US 12,307,500 B2
(45) Date of Patent: May 20, 2025

(54) EDGE COMPUTING STORAGE NODES BASED ON LOCATION AND ACTIVITIES FOR USER DATA SEPARATE FROM CLOUD COMPUTING ENVIRONMENTS

(71) Applicant: PayPal, Inc., San Jose, CA (US)

(72) Inventors: Michael Charles Todasco, Santa Clara, CA (US); Patrick Babcock, Sturbridge, MA (US); Avik Chatterjee, Phoenix, AZ (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/413,707

(22) Filed: Jan. 16, 2024

(65) Prior Publication Data
US 2024/0232981 A1    Jul. 11, 2024

Related U.S. Application Data

(63) Continuation of application No. 17/390,590, filed on Jul. 30, 2021, now Pat. No. 11,907,995.

(51) Int. Cl.
*G06Q 30/0601* (2023.01)
*G06F 16/27* (2019.01)
(Continued)

(52) U.S. Cl.
CPC ......... *G06Q 30/0631* (2013.01); *G06F 16/27* (2019.01); *G06F 16/273* (2019.01);
(Continued)

(58) Field of Classification Search
CPC .................................................. G06Q 30/0631
See application file for complete search history.

(56) References Cited

U.S. PATENT DOCUMENTS 10,977,907 B1    4/2021  Zalewski et al.
11,023,957 B1 *  6/2021  Montague ............. H04W 4/023
(Continued)

FOREIGN PATENT DOCUMENTS

WO    2020226979 A2    11/2020
WO    2021142384 A1    7/2021

OTHER PUBLICATIONS

International Search Report and Written Opinion for Application No. PCT/US2022/37476 mailed on Nov. 16, 2022, 12 pages.
(Continued)

*Primary Examiner* — Van H Oberly
(74) *Attorney, Agent, or Firm* — Haynes and Boone, LLP

(57) ABSTRACT

There are provided systems and methods for edge computing storage nodes based on location and activities for user data separate from cloud computing environments. A service provider, such as an online transaction processor, may provide additional services for to users via edge computing systems and edge computing storage nodes. The service may be for data that may be predictively loaded to the edge computing storage node for a particular location, where the edge computing storage node may reside more locally to the location on a network so that data may be served quicker and with less network resource consumption than providing data from a remote cloud computing storage. The data may be predicted to be needed or useful to the user at the location using a user profile for the user, monitored user activities, and/or one or more machine learning models that predict user behaviors at the location.

20 Claims, 8 Drawing Sheets

(51) Int. Cl.
  *G06F 16/9035*      (2019.01)
  *G06N 20/00*        (2019.01)
  *G06Q 30/0202*      (2023.01)
  *G06Q 30/0207*      (2023.01)

(52) U.S. Cl.
  CPC ......... *G06F 16/9035* (2019.01); *G06N 20/00* (2019.01); *G06Q 30/0202* (2013.01); *G06Q 30/0224* (2013.01); *G06Q 30/0633* (2013.01); *G06Q 30/0639* (2013.01)

(56)　　　　　References Cited

U.S. PATENT DOCUMENTS

| | | |
|---|---|---|
| 2009/0319175 A1 | 12/2009 | Khosravy et al. |
| 2014/0365304 A1 | 12/2014 | Showers et al. |
| 2015/0254745 A1 | 9/2015 | Meeboer |
| 2016/0037304 A1 | 2/2016 | Dunkin et al. |
| 2016/0162913 A1 | 6/2016 | Linden et al. |
| 2017/0091765 A1* | 3/2017 | Lloyd ................. G06Q 20/321 |
| 2018/0082352 A1 | 3/2018 | Mattingly et al. |
| 2019/0251598 A1 | 8/2019 | Showers et al. |
| 2020/0028910 A1 | 1/2020 | Tomimoto et al. |
| 2020/0126087 A1 | 4/2020 | Benkreira et al. |
| 2021/0012402 A1 | 1/2021 | Ellison |
| 2021/0233262 A1 | 7/2021 | Olshansky |
| 2021/0295341 A1 | 9/2021 | Schumacher et al. |

OTHER PUBLICATIONS

International Preliminary Report on Patentability for Application No. PCT/US2022/037476 mailed on Feb. 8, 2024, 11 pages.

* cited by examiner

EDGE COMPUTING STORAGE NODES BASED ON LOCATION AND ACTIVITIES FOR USER DATA SEPARATE FROM CLOUD COMPUTING ENVIRONMENTS

CROSS REFERENCE TO RELATED APPLICATION

The present invention is a Continuation of U.S. patent application Ser. No. 17/390,590, filed Jul. 30, 2021, the disclosure of which is incorporated herein by reference in its entirety.

TECHNICAL FIELD

The present application generally relates to edge computing networks and nodes, and more particularly to providing an edge computing storage node that are location-specific and provide compartmentalized data at faster speeds and lower latency.

BACKGROUND

Users may utilize various mobile computing devices, such as tablet computers, smart phones, and wearable computing devices, to perform computing operations and communications. For example, during everyday activities, users may encounter various situations where the users communicate with other users via devices, such as through phone calls and text messages with friends, family members, and the like. Users may also utilize computing devices at specific locations, for example, to perform electronic transaction processing, view content, such as maps and/or directions, search for items and services, and the like. However, mobile computing devices that interact with cloud computing services and systems may not receive location-specific data, and data retrieval speeds may be limited by network traffic, availability of cloud computes and resources, and the like. Thus, when attempting to retrieve data from cloud computing environments, user may experience wait times. Additionally, cloud computing environments are not location-specific and may not provide information that is relevant to a user at a current location or for activities the user may engage with at the location. When sharing data with the cloud computing environment, data may be unintentionally shared, contrary to a user's desired privacy levels.

Figure 1:
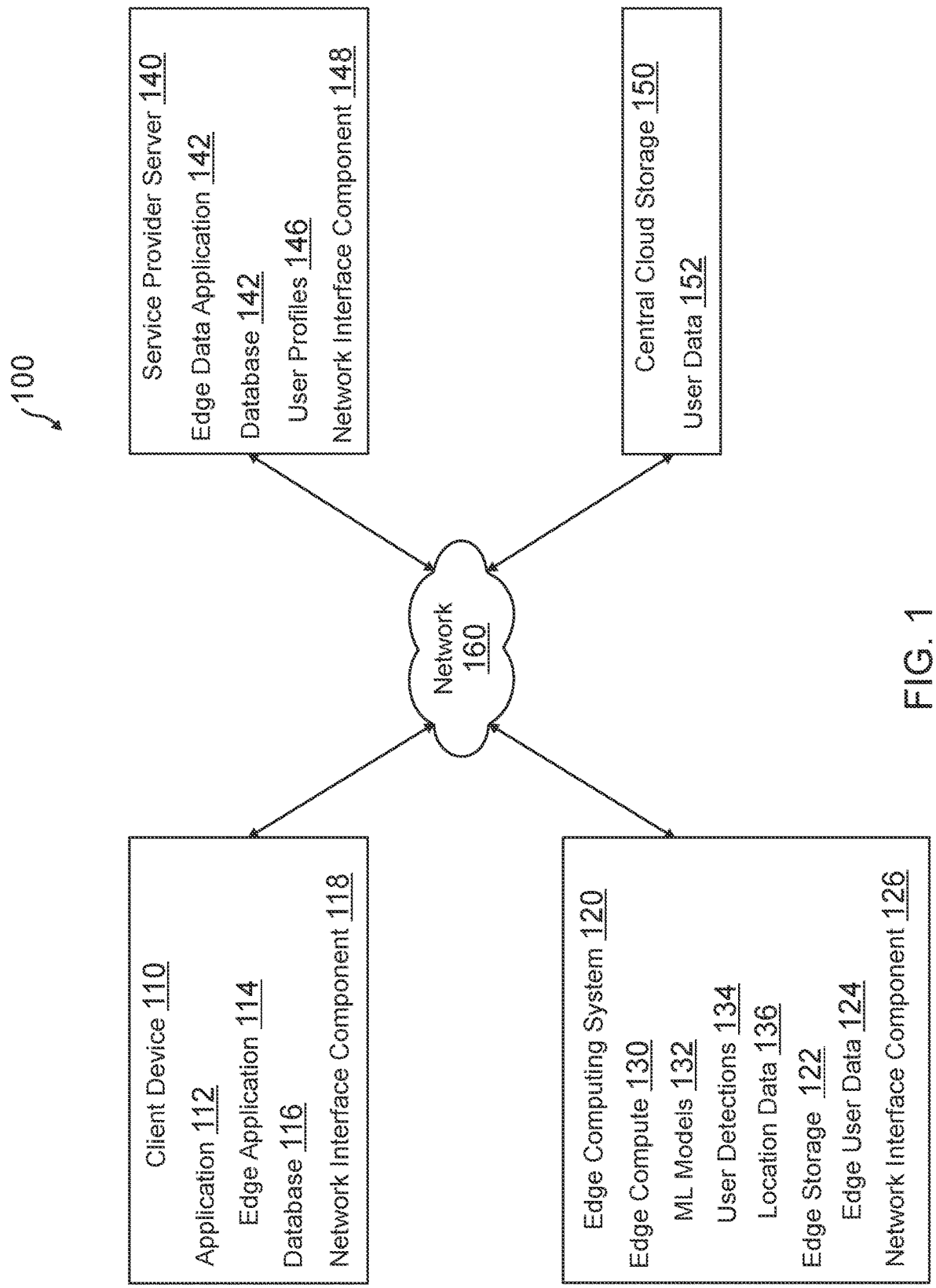
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for edge computing storage nodes based on location and activities for user data separate from cloud computing environments. Systems suitable for practicing methods of the present disclosure are also provided.

An online service provider, such as an online platform providing one or more services to users and groups of users, may provide a platform that allows a user to utilize one or more edge computing systems and edge computing storage nodes for location and activity-specific data and operations. An edge computing system may correspond to an auxiliary cloud computing system that may provide one or more edge computing nodes that are location-specific and provided on a network closer to the location so that data may be served faster and with lower latency to computing devices associated with the location. Edge computing may correspond to locating applications and data, including a general or specific-purpose compute, storage, and other operations to utilize those components, closer to end users on a network and/or using Internet of Things (IOT) endpoints. This allows for better application performance and faster provision of data from an edge storage node, thereby enhancing and improving experiences and quality of network usage for the applications and data. This may also improve efficiency and speed in delivering content to users. In one embodiment, an edge computing node may be provided by a cellular network (e.g., 5G, however, other cellular networks may also be utilized). Edge computing systems and nodes may also be provided by cloud computing systems, such as Amazon AWS®, Microsoft Azure®, and the like.

Additionally, edge storage nodes discussed herein may be location-specific and may retain data that is not shared with a cloud computing system. This may allow users to better protect their privacy, as well as service providers and cellular providers to comply with regulatory laws and requirements for data privacy and security with certain locations. A user may be detected as at or approaching a location and/or geofenced area, and a user profile for the user with a service provider may be identified. User activities by the user may be detected or monitored, which may be activities at the location and/or as the user is approaching the location (e.g., an intent to perform other activities at the location). Using one or more machine learning (ML) models, the service provider may determine a data storage action between the edge computing storage and a cloud computing storage or other central storage used by the user. A central storage may correspond to a centralized repository of data that may be utilized by a user, such as one residing on a remote server and/or cloud computing environment. The data storage action may move data between the two different storages, such as by locally providing some data from the cloud storage on the edge storage for faster provision to the user's mobile or computing device at the location. Thereafter, the service provider may further determine data that may be relevant to the user at the location (e.g., application data for an application of the user's device, such as an interactive map of the location), and may store the data to the edge computing storage for later use by the user.

In order for user to utilize these services, an online service provider (e.g., an online transaction processor, such as PAYPAL®) may provide account services to users of the online service provider, as well as other entities requesting the services. A user wishing to establish the account may first access the online service provider and request establishment of an account. An account and/or corresponding authentication information with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments. This information may be used to process transactions for items and/or services including purchases associated with a location visited by a user that is associated with an edge computing storage. Further, the incentives and past purchases may be provided to one or more edge computing storages, and/or used by the service provider when providing data to the edge computing storage(s). In some embodiments, the account creation may establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PAYPAL® or other online payment provider, may provide payments and other transaction processing services. However, other service providers may also provide the computing services discussed herein, such as telecommunication and/or cellular service providers.

Once the account of the user is established with the service provider, the user may utilize the account via one or more computing devices, such as a personal computer, tablet computer, mobile smart phone, or the like. The user may engage in one or more online or virtual interactions that may be associated with electronic transaction processing, images, music, media content and/or streaming, video games, documents, social networking, media data sharing, microblogging, and the like. This may be performed at certain locations and/or when travelling to or approaching those locations. A service provider may first detect, via the user computing device, a geolocation of a user and/or movement of the user, such as if the user is located within a geofenced area, is approaching a geofence or other location, and/or located at a specific location. The service provider may utilize a geolocation detection component of the user's computing device, such as a mobile smart phone. The service provider may also detect the user at or approaching a location using a cellular network provider, such as through cellular towers and/or triangulation using the cellular towers. In some embodiments, the cellular network provider (e.g., 5G provider) may provide specific edge storage nodes via certain cellular towers and/or using the cellular network.

Thus, the user is detected at or approaching a location, which may correspond to determining the user is within a specific location, geo-fenced location or area, and/or approaching a location or geo-fenced area. The user may be detected as approaching the location or geo-fenced area based on a movement of the user over a time period, such as a direction, velocity, acceleration, vector, or the like of the user. The service provider may then determine that an edge computing system and edge computing storage node is associated with the location. The service provider may utilize the cloud computing architecture, cellular network provider, or the like to determine an edge computing storage node associated with the location. This may be performed by geolocation lookup for corresponding edge computing storage nodes, identification of nearby network or cellular nodes used by the edge computing system, and other geolocation matching techniques for nearby edge computing storage nodes corresponding to the location and/or within a predetermined proximity or distance (on a network) to the location or geo-fenced area.

Once and edge computing storage node that is associated with the location is identified, the service provider may access a user profile for the user, which may be provided by the service provider and/or accessible from a cloud computing system associated with the service provider and/or user. The user profile may correspond to or include interests, preferences, activities, and other attributes set by the user and/or learned over time based on past user behaviors. For example, an ML model may be utilized to predict user interests and activities that a user may perform at a location, and what data from a cloud computing or edge computing system may be relevant to the user at the location. This may be based on past behaviors of the user, including past purchases, past activities, and the like. The user profile may also include preferences specifically established by the user for the location.

The service provider may also monitor or detect one or more activities by the user at the location and/or while the user approaches the location. The types of activities may correspond to travel routes, purchases or item selections, use of the user's mobile device (e.g., opening and/or using applications, providing input including searches for items and/or locations, communicating with other users, social networking or microblogging, electronic transaction processing, and the like), and other activities. The activities may be monitored through the user's device or utilizing one or more devices and/or sensors associated with the location. For example, activity on the user's device may be monitored, however, IoT sensors, point-of-sale (POS) devices, merchant terminals, and the like may also detect activities of the user or generate data associated with the activities that may be monitored. Thus, in some embodiments, the location may correspond to a merchant location (e.g., a retail storefront, a shopping center, or the like).

Based on the user profile and the monitored activities of the user at or approaching the location, the service provider may determine a data storage action or operation for data storage between the cloud computing system or other central storage of the user, and the corresponding edge computing system and edge storage node associated with the location.

The data storage action may move data between the cloud computing system's cloud storage and the edge storage node of the edge computing system based on the user profile and the monitored activities. A ML model associated with customer behaviors, interests, and/or other activities at the location may be used to predict an interest of the user at the location, such as an item of interest, another activity the user may be interested in performing, a sub-location of interest to the user, and the like by processing the user profile of the user and the monitored activities of the user.

For example, the ML model may consider similar user behaviors of other users (e.g., based on training data) to predict what may be of interest to the user. The past behaviors may include information associated with a gait or walking stride, one or more movements, an age, a demographic, a customer architype, a route through the location, or past activities at the location by other users in the past. Further, the past behaviors may be associated with purchases, activities, and/or sub-locations for the other users based on the information about their past behaviors. In this regard, the ML model and predicted data that may be utilized by the user at or when approaching the location, which may correspond to data for storage on the edge computing storage node for faster retrieval and access by the user when at the location. In this regard, the data may correspond to at least a portion of data for the user from the cloud computing system that is transferred and/or transmitted to the edge computing storage node for use by the user at the location. This allows data to be more localized to the user's device on a network and provides faster data loading and reduced latency. Furthermore, this may alleviate data privacy concerns that a user may have by maintaining certain data in a local node storage rather than a central storage. In other embodiments, the predicted data may also or instead be data that is shared back to the cloud computing storage, such as to update a profile of the user and/or make the data more widely available for the user across different storage platforms.

In various embodiments, the data that is exchanged for the data loading process or operation executed by the service provider may correspond to data associated with the location. For example, the data may be past purchases by the user, including receipts or transaction histories that may be relevant to the user (e.g., for a return, additional purchase, or the like). The data may also correspond to a map, which may be interactive, of past sub-locations visited by the user at the location and/or routes through and/or to sub-locations at the location (e.g., a route to an item the user commonly purchases at the location or another similar location). Other data that may be provisioned between the cloud and edge storage may correspond to loyalty or rewards accrued by and/or available to the user, as well as other payment mechanisms and/or instruments that may be utilized by the user. Data for identification and/or authentication of the user at the location may also be provisioned on the edge storage node or may be provided back to the cloud computing storage where established and/or used by the user at the location. Other types of data may also be shared between the storages, including data that may be used to build and/or update the user profile for the user.

If data is moved to the edge computing storage node, the data may then be shared with the user's mobile device or other computing device. The data may also be used to provide further application data and/or operations to the user by the service provider and/or an edge compute and/or application on the edge computing node for the edge computing storage that is associated with the location. For example, the service provider and/or a ML model for the edge compute and/or application may utilize the data that has been shared, loaded, and/or provisioned for the edge computing storage node to further predict interests of the user. For example, a predicted item of interest and/or potential purchase by the user may be determined using one or more ML models that may be located on the edge computing storage node, which may be based on the data loaded to the edge computing storage node. The predicted item may be based on a past user purchase, such as if it has been X months since a last purchase of the item and the user is expected to be out of the item and require a new purchase or refill. Other items may be predicted, such as based on interests of the user or other correlated purchases (e.g., requirement for batteries, other building supplies, etc.). When determining the item, the service provider and/or edge compute/application may further determine a sub-location for the item within the merchant's location and may generate an interactive map or other visualization for an application on the user's mobile device to locate the item within the location. This application data may then be stored on the edge computing storage node for quick provisioning to the user's mobile device.

In various embodiments, the service provider and/or edge computing may also predict other interests and/or activities of the user at the location, as well as incentives that may be earned or provided to the user at the location for activities engaged in by the user. For example, a scavenger hunt or activity for the user to find and/or visit certain sub-locations or objects at the location may be generated, where by completing tasks, visiting sub-locations, or finding object may earn rewards (e.g., points, discounts, benefits, and the like), which may be exchangeable and/or redeemable by the user at the location or another location, merchant, or service provider). The activity having these sub-locations, objects, or tasks may be provided through an interactive map, audiovisual output, or the like, which may be provided through application data in a mobile application of the user's device. In some embodiments, a mobile video game or other puzzle within an application may be generated to obtain the rewards at the location, which may be specific to the user. Thus, the application information may further include loyalty reward information for the location, an image file associated with the location, an audiovisual file associated with the location, media content for the location, or interactive game data for the location.

Such data may then be stored on the edge computing storage node and retrieved by the user's device when at the location or associated with an area for the edge computing node. Thus, the data may be moved from the edge computing storage node to the user's mobile device. In various embodiments, an authentication may be required to access the data, such as a credential stored by the user's mobile device and/or an authentication input by the user to the mobile device when the data is requested or pushed to the mobile device. In some embodiments, the authentication may correspond to a single user for the edge computing node. However, the edge computing storage node may also include user profiles and/or data for a plurality of users, which may authenticate separately or, if the users are associated with on another (e.g., a family, friends, business or company employees, etc.), the user may be authenticated in a group authentication.

In various embodiments, the service provider and/or edge compute/application for the edge computing storage node may further monitor additional activities by the user at the location, including those activities engaged in based on the data provided by the edge computing storage node to the user's computing or mobile device. This data may be stored on the edge computing storage node for later use by the edge compute and/or application, as well as the user. However, the data may not be shared back with the cloud computing system and/or central storage used by the user. This may be based on privacy settings by the user and/or opt-in/opt-outs to data sharing rules and parameters for the user. Further, the data may be prevented from being shared based on a privacy regulation associated with the edge computing system and/or cloud computing system, a privacy law affecting a region associated with the edge computing storage node and/or user, and the like.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 100 includes a client device 110, an edge computing system 120, a service provider server 140, and a central cloud storage 150 in communication over a network 160. Client device 110 may be used to establish an account with service provider server 140 and/or another service provider, which may include information of a user associated with client device 110. Client device 110 may be in possession of the user as the user approaches a location. Service provider server 140 may determine a subset of data associated with edge computing system 120 and/or central cloud storage 150 to exchange based on the user at the location, a user profile for the user, and/or monitored activities of the user at the location.

Client device 110, edge computing system 120, service provider server 140, and central cloud storage 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Client device 110 may be implemented using any appropriate hardware and software configured for wired and/or wireless communication with edge computing system 120, service provider server 140, and/or central cloud storage 150 for data communications, which may include retrieving data from edge computing system 120 while a user is utilizing client device 110 at a location associated with an edge data storage node of edge computing system 120. Client device 110 may correspond to an individual user, consumer, or merchant that utilizes a platform provided by edge computing system 120, service provider server 140, and/or central cloud storage 150 for data storage, processing, and retrieval.

In various embodiments, client device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

Client device 110 of FIG. 1 contains an application 112, a database 116, and a network interface component 118. Application 112 may correspond to executable processes, procedures, and/or applications with associated hardware. In other embodiments, client device 110 may include additional or different software as required.

Application 112 may correspond to one or more processes to execute software modules and associated components of client device 110 to provide features, services, and other operations for a user over network 160, which may receive data from edge computing system 120, service provider server 140, and/or central cloud storage 150 for output via application 112 at a location. In this regard, application 112 may correspond to specialized software utilized by a user of client device 110 that may be used to access a website or UI to perform actions or operations. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 160, including retrieving website information (e.g., a website for a merchant), presenting the website information to the user, and/or communicating information to the website.

However, in other embodiments, application 112 may include a dedicated application of service provider server 140 or other entity (e.g., a merchant). Application 112 may be associated with account information, user financial information, and/or transaction histories. However, in further embodiments, different services may be provided via application 112, including messaging, social networking, media posting or sharing, microblogging, data browsing and searching, online shopping, and other services available through service provider server 120. Thus, application 112 may also correspond to different service applications and the like that are associated with a location, merchant, service provider, edge computing system 120, service provider server 140, and/or central cloud storage 150.

In this regard, application 112 may be used to detect client device 110, and the corresponding user, as at or approaching a location, such as through a location detection component (e.g., GPS sensor and/or component, mapping application or process, compass process, or the like). Application 112 may further be used to monitor user activities at the location and/or as the user approaches the location, including interactions and activities on client device 110, detectable using client device 110 or a connected device (e.g., biometrics including heart rate, gait or walking speed, etc.), electronic transaction processing, and the like. Application 112 may provide the activities to edge computing system 120, service provider server 140, and/or another service provider, which may determine data from central cloud storage 150 to provide to edge computing system 120, or vice versa. Application 112 may receive edge application data 114 while at a location, such as interactive data, displays, and/or outputs that may provide relevant data of interest to the user for the location. Edge application data 114 may be retrieved and/or pushed to application 112 by edge computing system 120 while client device 110 is at or associated with the location for edge computing system 120.

Client device 110 may further include database 116 which may include, for example, identifiers such as operating system registry entries, cookies associated with application 112 and/or other applications, identifiers associated with hardware of client device 110, or other appropriate identifiers. Identifiers in database 116 may be used by a payment/service provider to associate client device 110 with a particular account maintained by the payment/service provider, such as service provider server 140. Database 116 may also further store entered and/or detected user activities, which may be monitored on client device 110 and shared with one or more of edge computing system 120, service provider server 140, and/or central cloud storage 150. Further, edge application data 114 may be stored to database 116 prior to, during, and/or after use.

Client device 110 includes at least one network interface component 118 adapted to communicate with edge computing system 120, service provider server 140, and/or central cloud storage 150 over network 160. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Edge computing system 120 may be implemented using any appropriate hardware and software configured for wireless communication with edge computing system 120, service provider server 140, and/or central cloud storage 150 to provide one or more edge computing cloud nodes, which may be utilized to by a user associated with client device 110 to quickly and with low data loading times, latencies, network communications and/or resource usage, and/or bandwidth usage. In this regard, edge computing system 120 may be provided as a cloud computing environment that utilizes edge nodes on a network, such as a 5G cellular network or other cellular network type for cellular providers. In other embodiments, edge computing system 120 may correspond to one or more devices and/or servers that make up an edge computing cloud node, including IoT devices and sensors and stand-alone or enterprise-class servers, operating an OS such as a MICROSOFT® OS, a UNIX® OS, a LINUX® OS, or another suitable server-based OS. Although only one edge computing system is shown, a plurality of edge computing systems may function similarly, and each edge computing system may include a plurality of edge computing nodes having edge computing storages and computes that are associated with different locations. In this regard, edge computing system 120 may reside more locally or within proximity on a network to a location to provide faster data transmission, loading, and providing, where more locally may be in comparison to central cloud storage 150.

Edge computing system 120 of FIG. 1 contains an edge compute 130, an edge storage 122, and a network interface component 126. Edge compute 130 may correspond to executable processes, procedures, and/or applications with associated hardware. In other embodiments, edge computing system 120 may include additional or different software as required.

Edge compute 130 may correspond to one or more modules and associated components of edge computing system 120 to execute edge applications and processes that provide data to client device 110, as well as determine data to provide to client device 110 and/or exchange data with central cloud storage 150 based on data storage requests and processes from service provider server 140. In this regard, edge compute 130 may correspond to specialized hardware and/or software utilized by edge computing system 120 to perform edge computing tasks and operations that may provide data to client device 110, such as edge application data 114 that is used via application 112. Edge compute 130 may further receive, access, and/or store data detected by edge computing system 120 and/or from central cloud storage 150, which may include edge user data 124. In this regard, edge user data 124 may correspond to a subset of data from central cloud storage 150 that is particular to edge computing system 120, client device 110's user, and/or a corresponding location. However, edge user data 124 may also include data specific to the user with edge computing system 120, which is not shared back with central cloud storage 150.

Edge compute 130 may also be used to provide client device 110 with data and/or determine data of relevance or interest to a user associated with client device 110. In this regard, edge compute 130 may receive the data, which may be provided and/or pushed to client device 110 based on a condition (e.g., being at or approaching the location for edge computing system 120, performing some activity, requesting the data, or the like). Edge compute 130 may further include ML models 132, user detections 134, and/or location data 136 to provide contextually relevant data. ML models 132 may take, as input, user detections 134, location data 136, and/or edge user data 124, and may make a prediction about an interest or contextually relevant data for the user associated with client device 110 at the corresponding location. For example, user detections 134 may be detected user locations and/or movements at or approaching a location, while location data 136 may include information specific to the location, such as a map, sub-location and/or layout, item or object locations, rewards and other available benefits, activities that may be engaged in, and the like. User detections 134 may also include one or more monitored activities of the user at or associated with the location. Edge user data 124 may correspond to all or a part of user data 152 stored by central cloud storage 150 and may also include information about user profiles 146 (e.g., preferences, interests, past purchases, etc.) stored by service provider server 140. Access to user data and transmission of edge application data 114 with edge computing system 120 may require authentication, which may be done automatically (e.g., by client device 110 providing an authentication token or credential automatically) and/or through user input, such as entry of an authentication mechanism including a password, access code, PIN, biometric fingerprint, voice response, facial recognition, a security question, request for a known phrase or name, or the like.

ML models 132 may make predictions about interests to the user, which provide a predictive output based on features from the input data. When building ML models 132 training data may be used to generate one or more classifiers and provide recommendations, predictions, or other outputs based on those classifications and an ML model. The training data may be used to determine input features for training predictive scores for contextually relevant data for edge application data 114 provided to client device 110 from edge computing system 120. For example, ML models 132 may include one or more layers, including an input layer, a hidden layer, and an output layer having one or more nodes, however, different layers may also be utilized. For example, as many hidden layers as necessary or appropriate may be utilized. Each node within a layer is connected to a node within an adjacent layer, where a set of input values may be used to generate one or more output scores or classifications. Within the input layer, each node may correspond to a distinct attribute or input data type that is used to train ML models 132.

Thereafter, the hidden layer may be trained with these attributes and corresponding weights using an ML algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for the ML models 132 that attempt to classify or predict edge application data 114 that may be provided to client device 110 at a location. Thus, when ML models 132 are used to perform a predictive analysis and output, the input may provide a corresponding output based on the classifications, scores, and predictions trained for ML models 132.

ML models 132 may be trained by using training data associated with past user behaviors and activities at the location associated with edge computing system 120, as well as the aforementioned features for user detections 134, location data 136, and/or edge user data 124 for the user and/or other users. By providing training data to train ML models 132, the nodes in the hidden layer may be trained (adjusted) such that an optimal output (e.g., a classification) is produced in the output layer based on the training data. By continuously providing different sets of training data and penalizing ML models 132 when the output of ML models 132 is incorrect, ML models 132 (and specifically, the representations of the nodes in the hidden layer) may be trained (adjusted) to improve its performance in data classification. Adjusting ML models 132 may include adjusting the weights associated with each node in the hidden layer. Thus, the training data may be used as input/output data sets that allow for ML models 132 to make classifications based on input attributes. The output classifications for ML models 132 trained for prediction of interests, contextually relevant data, and/or activities may be classifications of likelihood of a user requiring data. Such classifications may further be based on additional data, such as a gait, an age, a demographic, a customer architype, a route through the location, or past activities at the location.

Further, it is also understood that the determination and provision of the data (e.g., edge application data 114) may also be performed by service provider server 140 when providing data to client device 110, where the data may then be stored on and provided by edge computing system 120. As such, one or more of ML models 132 may be utilized and/or provided on service provider server 140 for predictive analysis.

Edge computing system 120 may further include edge storage 122 which may include, for example, identifiers associated with edge compute 130 and/or other applications, identifiers associated with hardware of edge computing system 120, or other appropriate identifiers. Edge storage 122 may receive and store data from central cloud storage 150, such as in response to a data exchange, transfer, and/or storage request by service provider server 140. Thus, edge storage 122 may further include edge user data 124, which may be provided to client device 110. Edge storage 122 may therefore correspond to an edge cloud storage residing on a network, such as one provided be a cellular network provided, and may reside closer on the network to a location in order to provide data to client device 110 in a fast and efficient manner.

Edge computing system 120 includes at least one network interface component 126 adapted to communicate with edge computing system 120, service provider server 140, and/or central cloud storage 150 over network 160. In various embodiments, network interface component 126 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 140 may be maintained, for example, by an online service provider, which may provide operations for transferring data between edge computing system 120 and central cloud storage 150. Various embodiments of the data storage processes described herein may be provided by service provider server 140 and may be accessible by client device 110 and edge computing system 120 or may be provided by central cloud storage 150 when provisioning data to edge computing system 120. In such embodiments, service provider server 140 may interface with client device 110 for detecting a user's location and/or monitoring user activities at a location, and determining data to provide edge computing system 120 from central cloud storage 150. Service provider server 140 includes one or more processing applications which may be configured to interact with edge computing system 120, service provider server 140, and/or central cloud storage 150. In one example, service provider server 140 may be provided by PAYPAL®, Inc. of San Jose, CA, USA. However, in other embodiments, service provider server 140 may be maintained by or include another type of service provider.

Service provider server 140 of FIG. 1 includes an edge data application 142, a database 144, and a network interface component 148. Edge data application 142 may correspond to executable processes, procedures, and/or applications with associated hardware. In other embodiments, service provider server 140 may include additional or different modules having specialized hardware and/or software as required.

Edge data application 142 may correspond to one or more processes to execute modules and associated specialized hardware of service provider server 140 to provide data, operations, and processes for provisioning data between edge computing system 120 and/or central cloud storage 150. In this regard, edge data application 142 may correspond to specialized hardware and/or software used by a user associated with client device 110 to establish an account with edge data application 142 and/or access another account with service provider server 140 or another service provider. For example, an account provided by PAYPAL® may be utilized to provide services to users. However, a more general account (e.g., a telephone, email, mobile service provider, etc.) may also provide the aforementioned account services when utilizing edge data application 142. In other embodiments, edge data application 142 may also or instead use user profiles 146 stored by database 144 for services to transfer or exchange data between edge computing system 120 and/or central cloud storage 150.

Edge detection application 142 may further execute one or more ML models, such as ML models 132 that may also or instead be provided with edge detection application 142 on service provider server 142. The ML models may be used to predict data that may be useful or relevant to a user associated with client device 110 while client device 110 is at a location associated with edge computing system 120. Edge detection application 142 may detect or receive location information for the user that indicates the user is at or approaching the location. Edge detection application 142 may further access one of user profile 146 for the user and may monitor user activities by the user at or while approaching the location. Using the data as input to the ML model(s), an output prediction or classification of data that may be relevant or useful to the user may be predicted, such as all or a portion of user data 152 that may include stored user data from past activities and information of the user. The data may further include an item or sub-location of interest, an activity of interest, rewards for the user, and the like that are available at the location. The ML models may be trained based on user and/or customer behaviors at the location, and thus may function the same or similarly to ML models 132 of edge computing system 120 to determine data that may be useful or relevant to the user while at the location. Thus, the ML model(s) may provide an output decision of the data for the user that is provided via edge computing system 120 to client device 110. Once the data that may be relevant to the user is predicted, edge data application 142 may be used to execute a data storage action, process, or request between edge computing system 120 and central cloud storage 150. For example, the data storage action may cause all or a portion of user data 152 to be transmitted to edge computing system 120 for storage by edge computing system 120 and further transmission to client device 110. This may allow for faster data loading times and latency with client device 110.

Additionally, service provider server 140 includes database 144. Database 144 may store various identifiers associated with client device 110. Database 144 may also store account data, including payment instruments and authentication credentials, as well as transaction processing histories and data for processed transactions. Database 144 may further store user profiles 146, which may be used by edge data application 142 when determining data to transfer and/or exchange between central cloud storage 150. As such, user profiles 146 in database 144 may include information about one or more users' interests, preferences, past activities and behaviors, account data, available funds and/or rewards, and the like. Computer or machine executable instructions may also be stored in database 144 or in a separate storage or database, where the instructions, when executed, enable a system or processor to perform operations as described herein.

In various embodiments, service provider server 140 includes at least one network interface component 148 adapted to communicate edge computing system 120, service provider server 140, central cloud storage 150, and/or another device/server for a merchant over network 160. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Central cloud storage 150 may be implemented using any appropriate hardware and software configured for wireless communication with client device 110, edge computing system 120, service provider server 140, and/or other devices and servers to provide a cloud computing environment and/or other centralized storage for users, which may be utilized to by a user associated with client device 110 to utilizing cloud storage, cloud applications, and the like for different user data. In this regard, central cloud storage 150 may be provided as a cloud computing environment that provides cloud-based services over a network to users. In other embodiments, central cloud storage 150 may correspond to one or more devices and/or servers for a centralized storage, including stand-alone or enterprise-class servers, operating an OS such as a MICROSOFT® OS, a UNIX® OS, a LINUX® OS, or another suitable server-based OS.

Central cloud storage 150 of FIG. 1 contains user data 152. Edge compute 130 may correspond to executable processes, procedures, and/or applications with associated hardware. In other embodiments, central cloud storage 150 may include additional or different software as required. For example, central cloud storage 150 may further include or be associated with one or more cloud computes corresponding to one or more (e.g., a pool) of available machines and resources, which may execute applications and the like to provide cloud computing-based environments and services to users, merchants, companies, and other entities via their corresponding devices and servers.

User data 152 may correspond to information associated with one or more users that is stored in a cloud computing environment or other centralized storage associated with central cloud storage 150. In this regard, user data 152 may correspond to past user activities, purchases, behaviors, application usages, data processing requests, searches and/or browser history, and other data that may be accrued for a user and stored in a cloud. In this regard, user data 152 may correspond to "big data" that may be collected for users over time. User data 152 may also include user inputs and/or settings, such as selections of interests, preferences, items, locations, and the like that a user may set, such as in a user profile. User data 152 for a particular user may be large and unspecific but may also include data that may be relevant to a user at a specific location, such as one associated with edge computing system 120. Thus, at least a portion of user data 152 may be allocated to edge computing system 120 for use at a corresponding location, which may be capable of serving the data to client device 110 faster and with lower latency.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2A:
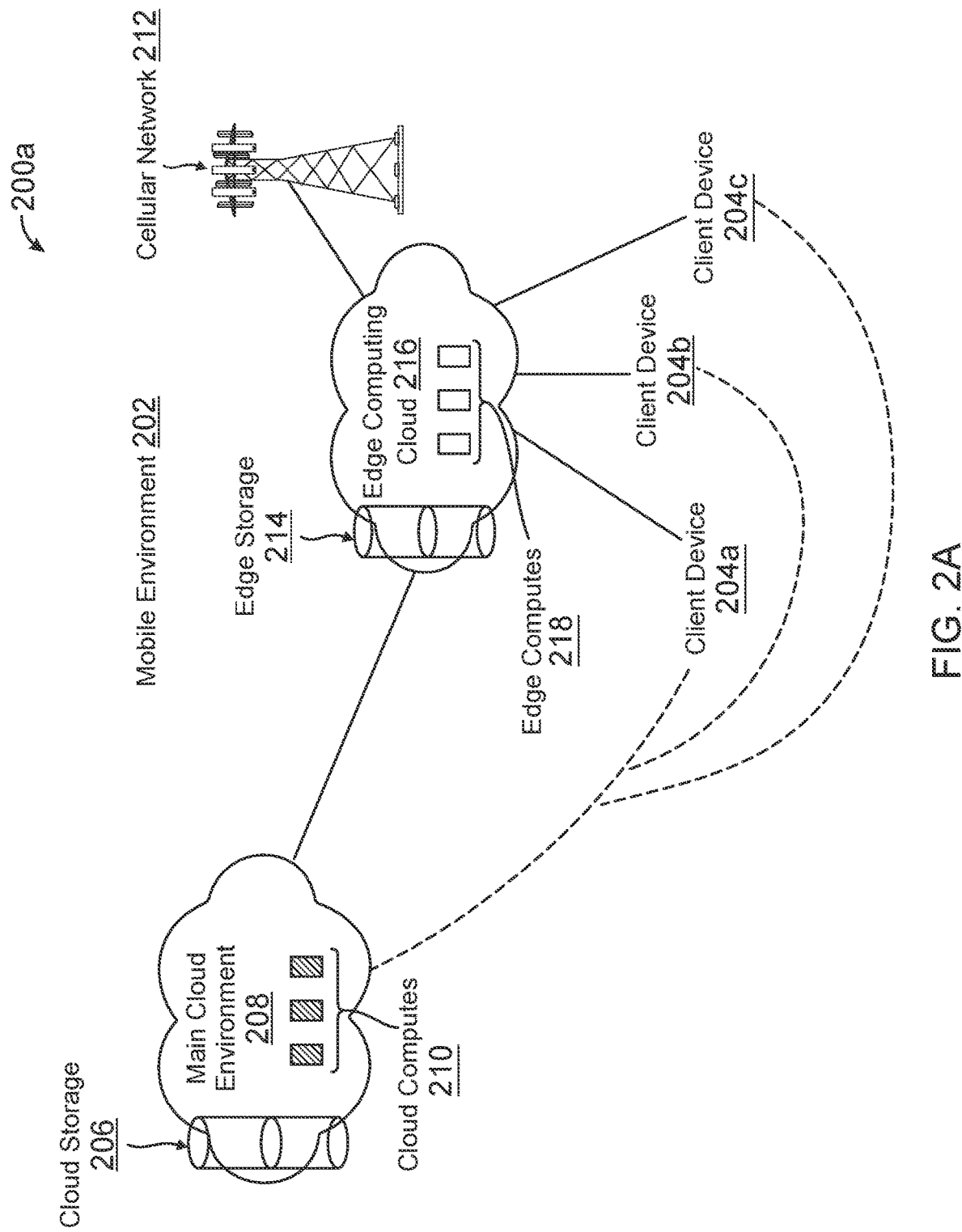
FIG. 2A is an exemplary environment having an edge computing storage node in communication with a cloud computing environment and mobile devices, according to an embodiment.

FIG. 2A is an exemplary environment 200a having an edge computing storage node in communication with a cloud computing environment and mobile devices, according to an embodiment. Environment 200a includes client devices 204a, 204b, and 204c each corresponding to client device 110 discussed in reference to system 100 of FIG. 1. Further, environment 200a includes an edge computing cloud 216 and a main cloud environment 208 corresponding generally to edge computing system 120 and central cloud storage 150, respectively, discussed in reference to system 100. Environment 200a may correspond to a system for providing relevant user and/or application data to edge computing cloud 216, which may then provide the data to client devices 204*a-c*.

In system environment 200*a*, a mobile environment is shown where mobile smart phones and other computing devices may interact with different components during use at or within a proximity to a location, such as when approaching a location, within a geofenced area, and the like. The mobile environment includes client devices 204*a-c* being operated by users when users are at or approaching a location. Client devices 204*a-c* may utilize a cloud storage 206 with a main cloud environment 208, such as for the storage of user data and/or use of cloud computing services. In this regard, cloud computes 210 may serve to provide those services, such as by executing cloud applications and operations to store data in cloud storage 206 and/or use the data during interactions and requests with client devices 204*a-c*. Thus, client device 204*a-c* may, at times, communicate with main cloud environment 208 to access data from cloud storage 206, request data processing and services from cloud computes 210, and the like. In some embodiments, main cloud environment 208 may be provided by a cloud computing system, such as Amazon AWS®, Microsoft Azure®, and the like. However, other cloud computing systems may function similarly and provide cloud storage 206 to client devices 204*a-c*.

However, it may be desirable that client devices 204*a-c* receive information faster and/or compartmentalize information from main cloud environment 208, such as for quality of experience (QoE), privacy, and/or other concerns of users and/or service providers. In this regard, a cellular network 212 may be utilized to provide an edge storage 214 that may more locally (e.g., closer in proximity on a network to a location of client devices 204*a-c*) store data with edge computing cloud 216. Cellular network 212 may correspond to a 5G cellular network provided by a cellular network provided associated with client device 204*a-c*, main cloud environment 208 and/or a location for edge computing cloud 216. In other embodiments, main cloud environment 208 may instead provide edge computing cloud 216, which may be provided using cellular network 212 and/or another network utilized by main cloud environment 208.

A service provider and/or main cloud environment 208 may determine that one or more of client devices 204*a-c* may require data from cloud storage 206 and/or data that may be provided based on data within cloud storage 206 while client devices 204*a-c* are at a location associated with edge computing cloud 216 (e.g., user data associated with behaviors and activities of a user at the location associated with edge computing cloud 216). In this regard, a data storage action, such as a transfer, transmission, or other exchange action, may be determined to provision data from cloud storage 206 to edge storage 214. This may be executed prospectively in order to predict data that may be useful or relevant to client devices 204*a-c* while the devices are at the location.

Edge computing cloud 216 may receive the data and may store the data with edge storage 214. Thereafter, when the data is needed by client devices 204*a-c*, or is predicted to be needed or used, the data may be provided from edge storage 214 to client devices 204*a-c*. This may include pushing the data or transmitting in response to a request for the data. Edge computes 218 may also use the data when executing one or more edge applications or processes, such as ones associated with ML models for customer behaviors at the location. In such embodiments, the data may be used to provide an interactive map showing items, sub-locations, and/or objects of interest, routes through the location and/or to sub-locations, activities of interest or required by the user at the location, rewards and games or scavenger hunts to obtain rewards, and the like. Additionally, the data and other data, such as additional monitoring data of the users and/or client devices 204*a-c* at the location, may be stored by edge storage 214 and may not be shared back with cloud storage 206. This may be performed based on privacy laws or regulations, based on user requests or opt-ins/outs, and the like.

Figure 2B:
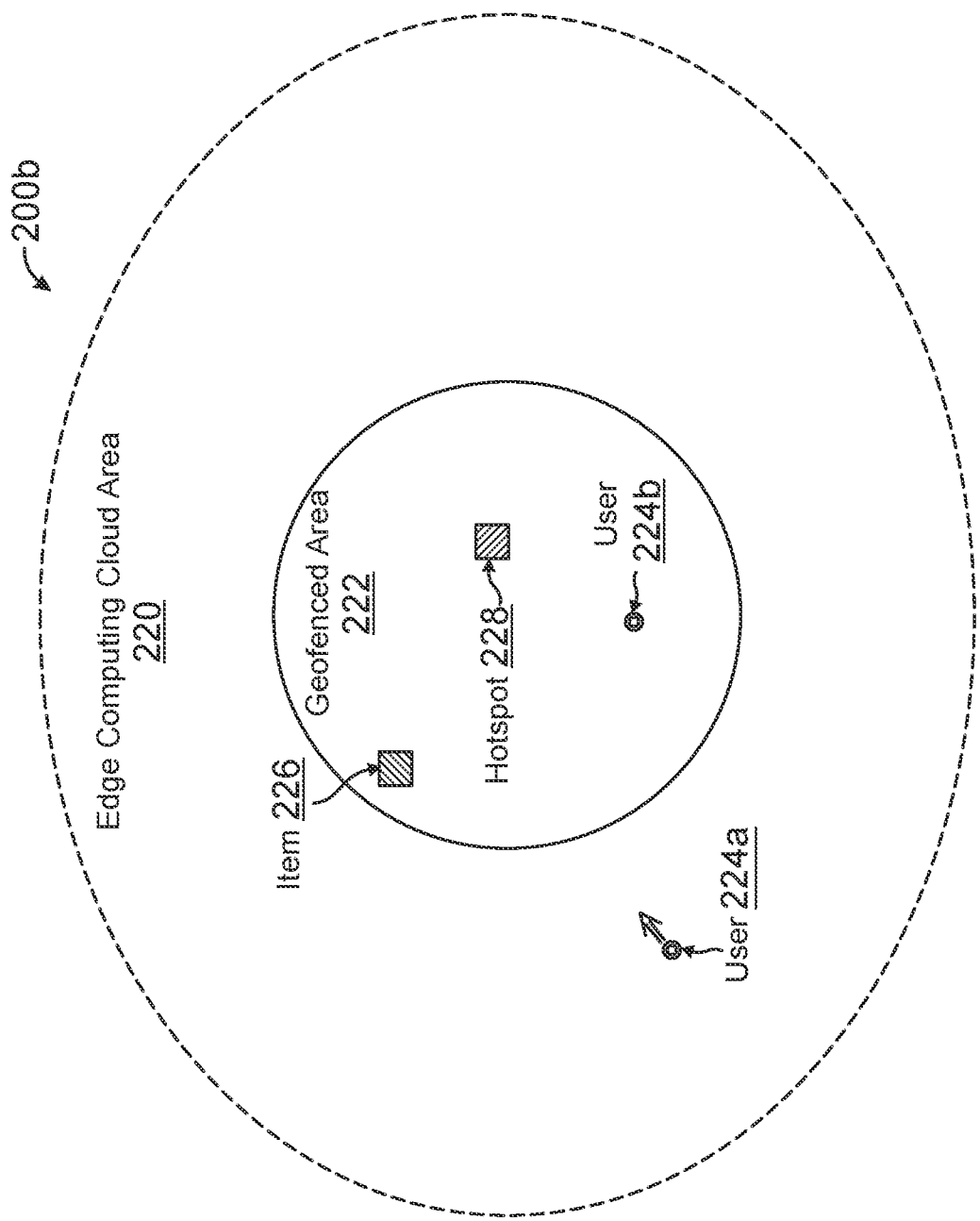
FIG. 2B is an exemplary environment having an edge computing storage node that provides location-specific data based on a user profile and data stored on the edge computing storage node, according to an embodiment.

FIG. 2B is an exemplary environment 200*b* having an edge computing storage node that provides location-specific data based on a user profile and data stored on the edge computing storage node, according to an embodiment. Environment 200*b* includes users 224*a* and 224*b* that may interact with the computing systems of system 100 and/or environment 200*b*, such as through client device 110 and edge computing system 120 discussed in reference to system 100 of FIG. 1 and/or client devices 204*a-c* in environment 200 of FIG. 2. Environment 200*b* may correspond to a system for providing data via edge computing system 120 to users 224*a-b* via their computing devices, such as mobile devices.

In environment 200*b*, user 224*a* may be approaching a location designated by geofenced area 222, such as a merchant location (e.g., a physical store that may sell items). User 224*a* may have a specific purpose for visiting geofenced area 222, such as to purchase an item. The item may be a refillable item, such as soft water pellets that need to be purchased at set or fairly regular intervals. The item may be known for user 224*a* based on a search history, past purchase, an interest or preference of the user, or the like. This user data may be established with a cloud computing system, but relevant to an edge computing system for an edge computing cloud area 220 that includes geofenced area 222. For example, the edge computing system may utilize this user information to provide user 224*a* with an interactive map of geofenced area 222 that displays a pathway or route to item 226 in the map. Thus, as user 224*a* is detected within edge computing cloud area 220 and/or approaching geofenced area 222, activities and other parameters of user 224*a* may be detected and a ML model may predict user 224*a* needs such items based on those activities and a user profile for user 224*a*. The edge computing system's edge storage node for edge computing cloud area 220 and/or geofenced area 222 may be loaded with this information from the cloud computing system. User 224*a* may then quickly receive the interactive map and other application or user data via their computing device.

User 224*b* may instead be browsing through geofenced area 22 or otherwise not specifically targeting an item or activity of interest. The activities of user 224*b* may be detected, such as browsing items or slowly walking down different pathways or aisles that do not indicate a certain interest. Using these activities and user profiles, a ML model may predict that user 224*b* may be interested in receiving rewards, playing a game within geofenced area 222, and/or go on a scavenger hunt, the latter two of which may provide rewards to user 224*b*. For example, visiting hotspot 228 and/or performing some activity at hotspot 228 may cause user 224*b* to be rewarded. The particular rewards may be based on a user profile for user 224*b*, such as past purchases where rewards may entice user 224*b* to an additional purchase within geofenced area 222. Thus, the edge computing system for edge computing cloud area 220 may be loaded with specific user data, as well as the activities of user 224*b* and other relevant data, so that application data (e.g., an interactive map, but also other data of interest such as loyalty reward information, an image file, an audiovisual file, media content, or interactive game data) may be quickly shared with user 224b. In this regard, the application data may provide information for user 224b to visit hotspot 228, an object or activity at hotspot 228, and the like.

Figure 3:
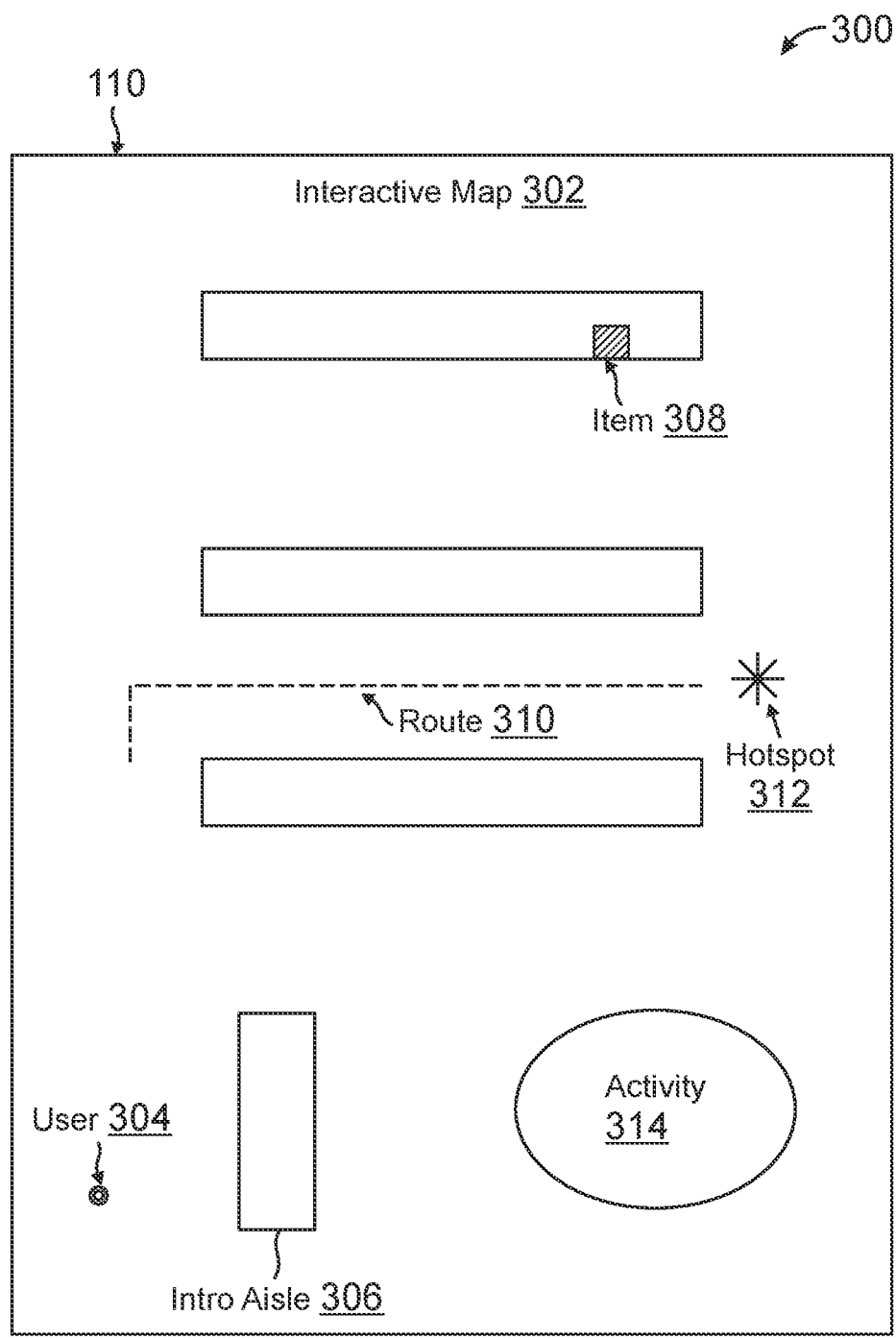
FIG. 3 is exemplary interface of a mobile device when presenting location-specific data to a user from an edge computing storage node, according to an embodiment.

FIG. 3 is exemplary interface 300 of a mobile device when presenting location-specific data to a user from an edge computing storage node, according to an embodiment. Interface 300 of FIG. 3 may be displayed by client device 110 discussed in reference to system 100 of FIG. 1. In this regard, edge computing system 120 may provide data for display of interface 300 in an application based on a user profile and user activities of a user 304 at a location associated with edge computing system 120.

User interface 300 on client device 110 may display an interactive map 302 that includes information of relevant data, activities, or interests to a user at a location. In general, merchant storefronts may have different areas and "real estate" for items. More prime areas may be those with higher visibility, such as when entering a store (e.g., an intro aisle 306). However, not all items may be placed in these high visibility areas, and users may not be interested in the items placed in high visibility areas. Instead, user 304 may wish to find an item that may be more hidden, such as located in a back aisle or a hard to find place. Additionally, user 304 may be interested in obtaining rewards or performing other browsing activities that may result in obtaining rewards or other benefits of interest to the user.

In this regard, interactive map 302 may be loaded to client device 110 from an edge computing storage node associated with the location of interactive map 302. Interactive map may be specialized for user 304 and may be generated, loaded, and output based on predictions for user 304 from a user profile and/or monitored activities of user 304, such as those activities at the location. User 304 may be interested in an item 308, which is not located in intro aisle 306 but instead hidden in a back aisle. Thus, interactive map 302 may show a location of item 308 based on the user's profile and activities. This allows user 304 to quickly find item 308.

Additionally, since user 304 is also predicted to be interested in rewards based on their user profile and/or activities, interactive map provided by the edge computing storage node may include information to obtain those rewards by completing certain activities. For example, a route 310 shows a pathway to a hotspot 312. If user 304 follows route 310, user 304 may be rewarded by arriving at hotspot 312 and/or performing some activity at hotspot 312. An activity 314 is also shown in an area of the location for interactive map 302. Activity 314 may be some activity of interest to user 304, such as predicted based on the user profile and activities of user 304 (e.g., a presentation, a class, a performable activity to receive rewards, audiovisual content of interest, etc.). Thus, interactive map 302 further shows activity 314 within the location. Further activities of user 304 may be monitored when using interactive map 302 and/or while at the location, which may be provided and/or stored by the edge computing storage node. This may include preventing sharing with a cloud computing system and storage so that the data resides in the edge computing storage node instead of the cloud or central storage.

Figure 4A:
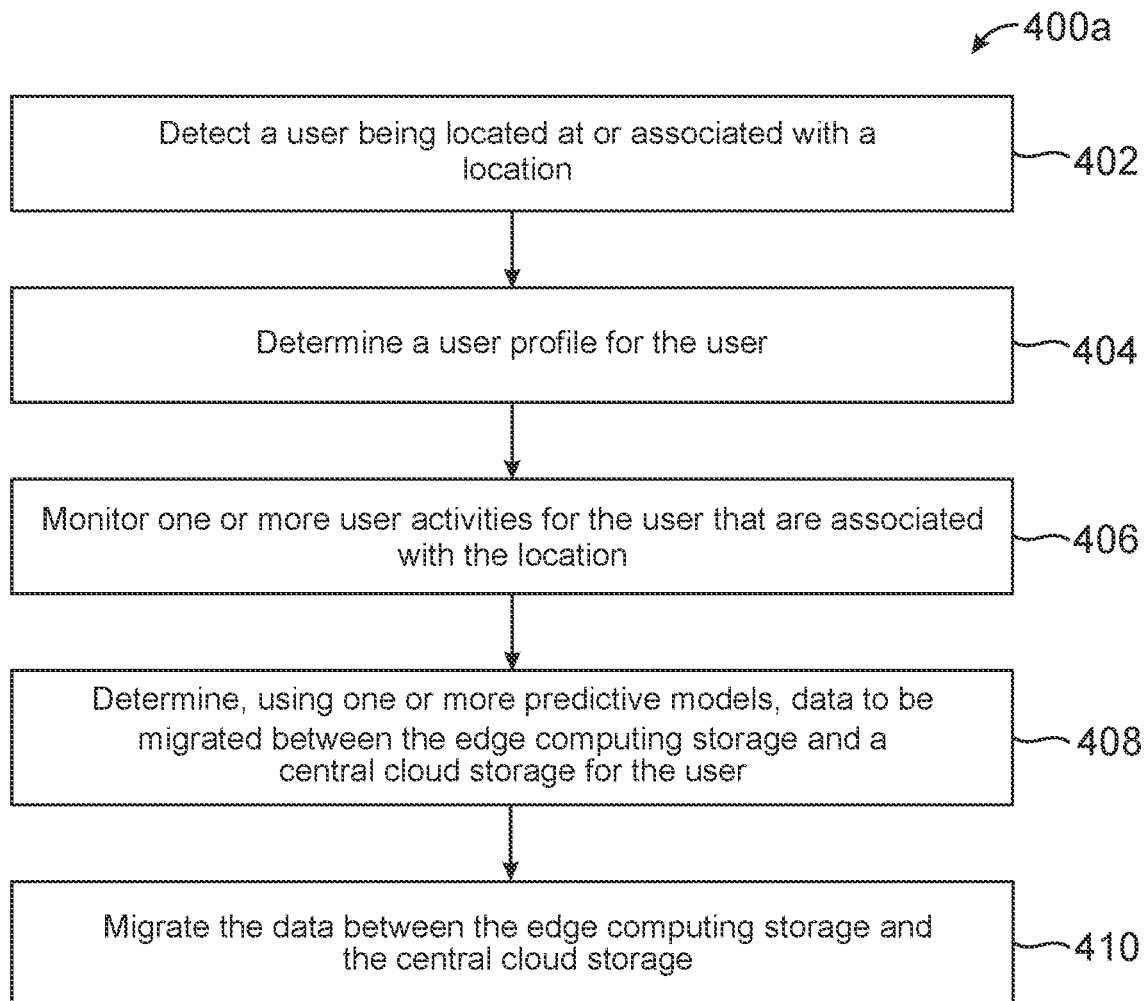
FIG. 4A is a flowchart for exchanging data between a cloud computing system and an edge computing system, according to an embodiment.

FIG. 4A is a flowchart 400a for exchanging data between a cloud computing system and an edge computing system, according to an embodiment. Note that one or more steps, processes, and methods described herein of flowchart 400a may be omitted, performed in a different sequence, or combined as desired or appropriate.

At step 402 of flowchart 400a, a user is detected as being located at or associated with a location. In one or more embodiments, based on the detection, an edge computing storage node may be determined that corresponds to the location. The edge computing storage may reside more locally and/or in closer proximity on a network (e.g., using more local devices, servers, IoT components and devices, and the like for the location). The user may be detected using a location detection component of their computing device, a cellular network and one or more cellular towers, a check-in or other social networking post, and/or a location-specific device that uses short range wireless communications at the location. At step 404, a user profile for the user is determined. The user profile may correspond to both settings by a user (e.g., user interests, preferences, etc.) and past data detected or accrued for the user (e.g., past purchases, search histories, messages and/or communication exchanges, etc.).

At step 406, one or more user activities for the user that are associated with the location are monitored. This may include user biometrics and/or other user movements and body activities at the location (e.g., gait, sub-locations visited, etc.). However, other activities may include activities and interactions with a computing device and/or with other users at the locations. These are monitored to determine a predicted reason or the like for visiting the location. At step 408, data to be migrated between the edge computing storage and a central cloud storage for the user is determined, such as by using one or more predictive models. The predictive model(s) may correspond to ML models that may predict customer behavior and/or other user behaviors or activities of interest at a location. In this regard, the ML models may attempt to predict what activity the user is likely to perform at a location and/or what may be of interest to the user at the location.

The data to be migrated may correspond to all or a subset of the data from the central cloud storage that may be of more relevance to the user at the location and/or used by an edge computing system to provide data from the edge computing storage to a device of the user. For example, the data may correspond to interests and/or rewards of the user that are redeemable at the location. The interests may be used to provide the user with an interactive map to the item at the location, which may reside on the edge computing storage. Thus, the data may be of particular relevance to the user at the location, and thus improve QoE and data loading/latency times by storing on the edge computing storage. In other embodiments, the data may correspond to data that is required to be loaded from the edge computing storage to the cloud computing storage. Thus, the data migration from the cloud computing storage to the edge computing storage, or vice versa, may occur in a single direction. However, in other embodiments, the data migration may also correspond to a data exchange and/or data synchronization between storages. Thus, data may be stored to a single one of the edge computing storage (or multiple similar or related edge computing storages) or the cloud computing storage, however, other data migrations and exchanges may also occur.

In various embodiments, the data to be migrated between the central cloud storage may be selected, restricted, and/or limited based on data privacy laws, regulations, and/or preferences. Data privacy laws and/or regulations may be location-specific and therefore apply to a location of the user (e.g., state, country, or other region associated with the user), a location associated with the central cloud storage (which may span multiple locations, regions, countries, or the like), and/or a location corresponding to the edge computing storage. However, the user may opt-in or assign their own data privacy settings with the central cloud storage, the service provider, and/or the edge computing storage, which may limit data shared between the central cloud storage and/or edge computing storage. The merchant may also have data privacy rules or preferences for data sharing. Thus, some data may be prevented or limited from being shared or may be required to be scrubbed or abstracted from PII or other sensitive data. The data privacy restrictions limiting data sharing may therefore depend on the user profile, the data type, the merchant and/or location of the user, and the like.

Thus, the user profile, the laws and regulations associated with the location, a merchant profile, and the like may be analyzed to identify and/or determine a privacy profile or privacy settings for the user. The privacy profile may correspond to those privacy requirements that limit or adjust data and types of data from sharing or migrating between the edge computing storage and the central cloud storage. In some embodiments, the privacy profile may limit data in a particular direction. For example, the data may be validly stored by one of the edge computing storage or the central cloud storage, but not the other. In this regard, certain PII or financial data may be limited from being migrated from the central cloud storage to the edge computing storage but may be validly stored with the central cloud storage. Conversely, the edge computing storage may store certain location-specific data, monitored activities of the user at the location, and/or electronic transaction processing information at the location, but may be restricted from being shared back with the central cloud storage.

The limitations and preferences for data privacy may therefore be utilized as another feature input to the ML model(s) trained to predict data to migrate from one of the edge computing storage or the central cloud storage to the other. The ML model(s) may therefore restrict or remove data that is predicted to be migrated from one platform to another based on the privacy profile. At step 410, the data is migrated between the edge computing storage and the central cloud storage. This may correspond to transferring and/or transmitting the data so that data may reside on the edge computing storage and be more quickly provided to the user's device. However, where data is provided back to the central cloud storage, the data may be provided so it is more widely available.

Figure 4B:
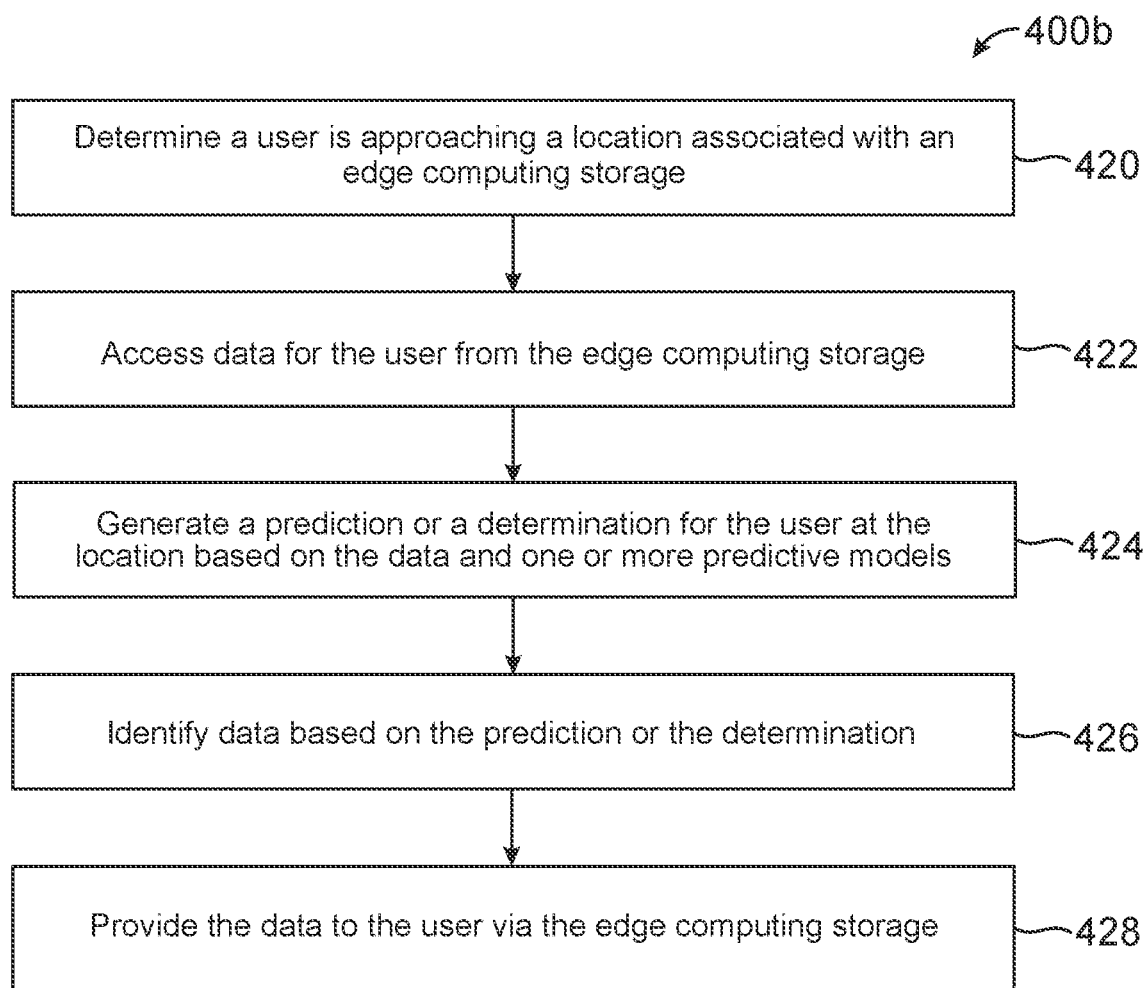
FIG. 4B is a flowchart for providing location-specific data using an edge computing system, according to an embodiment.

FIG. 4B is a flowchart 400*b* for providing location-specific data using an edge computing system, according to an embodiment. Note that one or more steps, processes, and methods described herein of flowchart 400*b* may be omitted, performed in a different sequence, or combined as desired or appropriate.

At step 420 of flowchart 400*b*, a user approaching a location associated with an edge computing storage is determined. The user may be identified as approaching the location based on a geolocation and/or a current movement, such as speed and/or direction of the user, vehicle that the user is utilizing, schedule of the user, and/or other parameter for the user. In some embodiments, the user may be detected as approaching a location by detecting the user as entering a geo-fenced area for the location, such as a parking lot or structure, area wider than the specific location (e.g., a campus), or the like. However, the user may also be detected at or within a location by detecting a geolocation of the user and matching or correlating that geolocation to the location.

At step 422, data for the user is accessed from the edge computing storage. The data may be migrated or moved to the edge computing storage from a central storage, such as a cloud computing storage utilized by the user. In one or more embodiments, the data may be determined or predicted as useful or relevant to the user at the location, and therefore stored or migrated to the edge computing storage so it may be more quickly accessed (e.g., with lower load times and/or latency). For example, based on detecting the user at the location referenced in step 420, a certain data corresponding to the location or user specific data may be migrated from a central storage to the edge computing storage/node associated with the location. In some embodiments, the data may be location-specific data for the user, such as past purchases, available rewards, interests of the user at the location, scheduled activities or past activities performed by the user at the location, and other data that may be associated with the location. However, in other embodiments, the data may not be specifically associated with the location and correspond to a broader scope of data for the user, such as all or a portion of a user profile that may be used to make predictions corresponding to the user.

At step 424, a prediction or a determination corresponding to the user at the location is generated based on the data and one or more predictive models. The predictive model(s) may correspond to ML model(s) based on past customer behaviors, interests, purchases, activities, and the like at the location. In some embodiments, the ML model(s) may further be trained for specific groups, demographics, age ranges, and the like for users in order to predict data for the user at the location. Thus, the prediction or determination may include transmitting data that the user is predicted to desire to their device when at the location and/or when using the edge computing storage (e.g., based on faster load times and/or lower latency required to receive the data). In one or more embodiments, the data may be migrated to the edge computing storage associated with the location as a part of the prediction or determination process. In some embodiments, the data may also correspond to location-specific data that is associated with the location, for example, as discussed in flowchart 400*c* of FIG. 4C.

At step 426, based on the prediction/determination, data corresponding to the prediction or determination may be identified. The relevant data may be data stored to the edge computing storage, or may be data with another storage, such as a cloud computing storage, database system associated with the location, and/or database system for a service provider predicting the relevant data to the user. Thus, the data may be required to be retrieved and/or generated based on internal and/or external data for the edge computing storage. At step 428, the data is provided to the user via the edge computing storage. The data may be retrievable when requested by a computing device of the user or may be pushed to the user's computing device automatically. When pushing the data to the user's computing device, the data may be pushed from the edge computing storage to the computing device when the user is approaching or at the location, or may be pushed when useful to the user, such as at a checkout location or other sub-location within the location. Thus, the data may be provided faster loading times and lower latency using the edge computing storage.

Figure 4C:
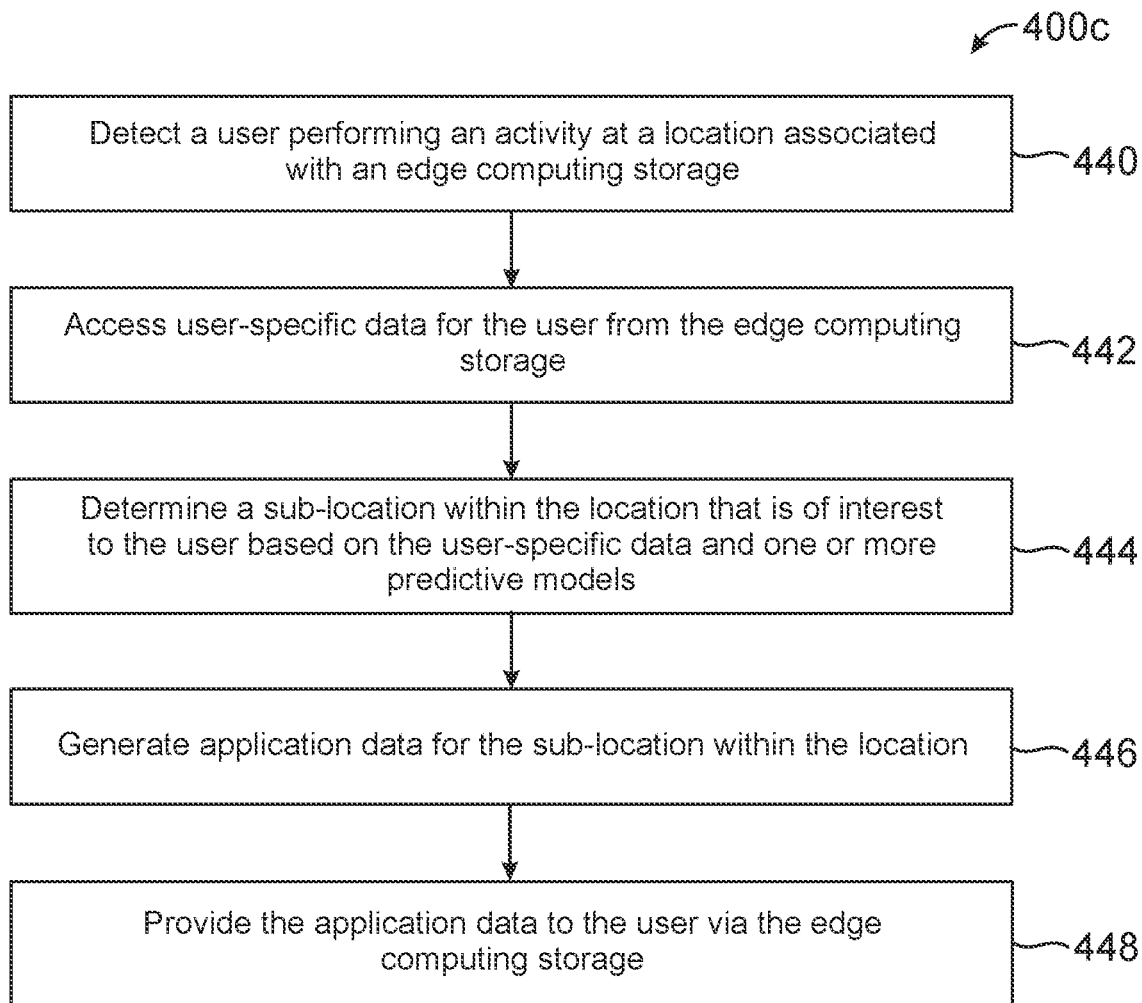
FIG. 4C is a flowchart for providing application data associated with a sub-location of interest to a user within a location using an edge computing system, according to an embodiment.

FIG. 4C is a flowchart 400*c* for providing application data associated with a sub-location of interest to a user within a location using an edge computing system, according to an embodiment. Note that one or more steps, processes, and methods described herein of flowchart 400*c* may be omitted, performed in a different sequence, or combined as desired or appropriate. Flowchart 400*c* of FIG. 4C includes a sub-embodiment or specific category of the prediction provided in flowchart 400*b* of FIG. 4B.

At step 440 of flowchart 400c, a user performing an activity at a location associated with an edge computing storage is detected. The activity may be some action or interaction that the user is engaged in at the location. This activity may be with the user and an object, person, or other thing at the location, may be with the user and their corresponding device, and/or may be an upcoming or predicted activity for performance by the user at the location. At step 442, user-specific data for the user is accessed from the edge computing storage. For example, the user-specific data may correspond to user data of the user that may be loaded to the edge computing storage specifically from a cloud computing or central storage used by the user. The user-specific data may therefore correspond to data that is particularly relevant or useful for the current location of the user.

At step 444, a sublocation within the location that is of interest to the user is determined based on the user-specific data and the one or more predictive models. The sub-location may correspond to an item the user would like to purchase, an activity the user would like to engage in, and/or an area that may be of interest to the user. The sub-location may also correspond to a location where the user may obtain a reward or the like for visiting. Thus, at step 446, application data for the sub-location within the location is generated. The application data may correspond to data for a specific application on the user's device, which may be output by the application. For example, the application data may include an interactive map that the user may utilize, audiovisual content, a video game or the like, and/or data that may be used within the application (e.g., a reward usable with electronic transaction processing in the application).

At step 448, the application data is provided to the user via the edge computing storage. The application data may be retrievable by a computing device of the user, such as a mobile smart phone or other mobile device, which may request the data from the edge computing storage. However, in other embodiments, the application data may be pushed from the edge computing storage to the user's computing device, such as when detecting the user is at or approaching the location and/or likely to visit the sub-location. The application data may be provided faster and with lower loading times and/or latency through the use of the edge computing storage.

Figure 5:
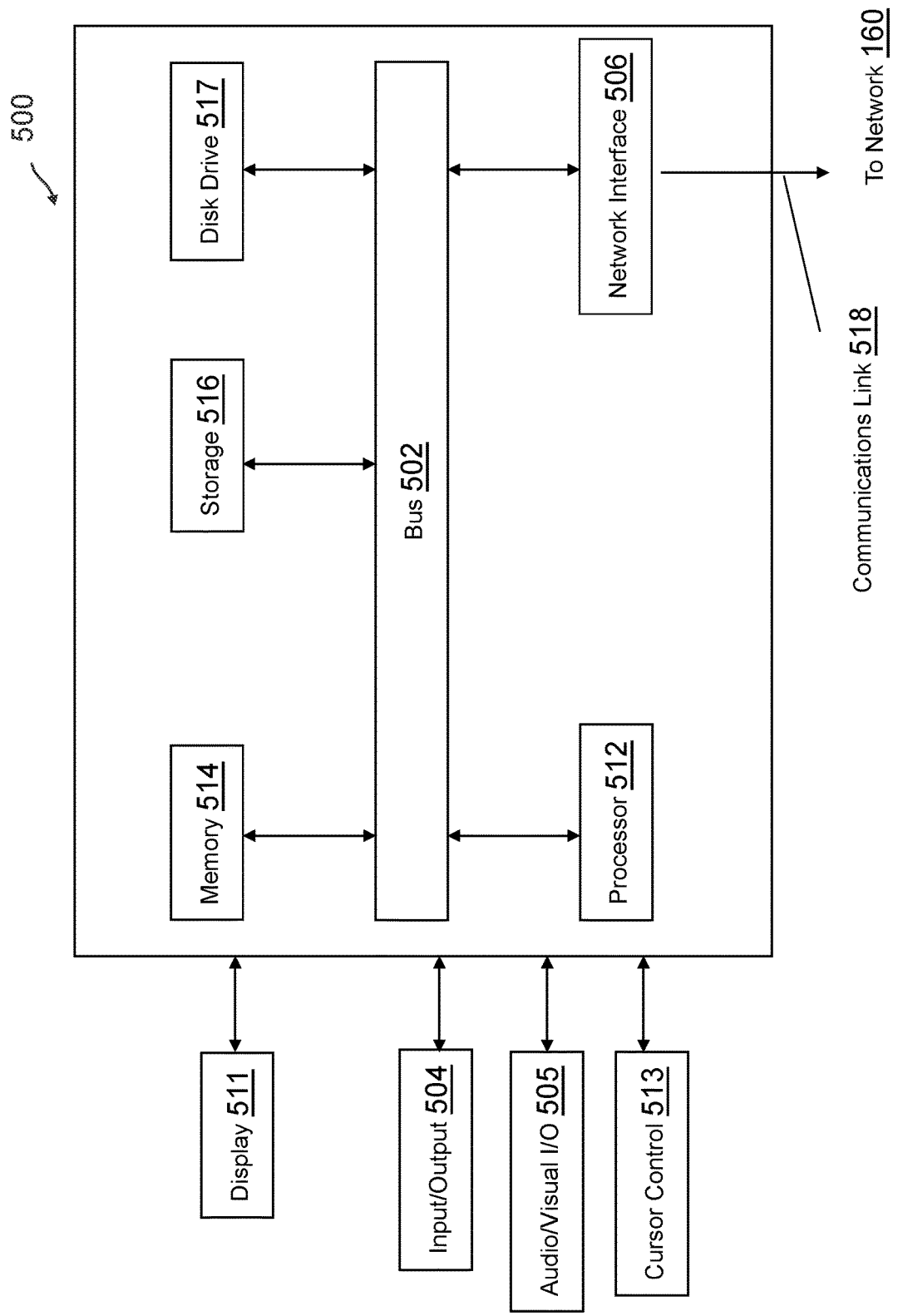
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. For example, while the description focuses on gift cards, other types of funding sources that can be used to fund a transaction and provide additional value for their purchase are also within the scope of various embodiments of the invention. Thus, the present disclosure is limited only by the claims.

What is claimed is:

1. A system comprising:
a non-transitory memory; and
one or more hardware processors coupled to the non-transitory memory and configured to execute instructions to cause the system to:
detect a mobile device of a user at or approaching a location associated with an edge computing cloud storage, wherein the edge computing cloud storage is separate from a primary cloud computing storage for a networked data storage system;
monitor one or more activities corresponding to the user at or approaching the location;
determine a privacy setting for user data associated with the user that is stored by the primary cloud computing storage, wherein the privacy setting restricts sharing of the data based on the location and a type of the data to share;
determine, using a machine learning (ML) model and based on the monitored one or more activities and the privacy setting, shareable data to share with the networked data storage system from the user data, wherein the shareable data is shared with the networked data storage system to reduce a latency to load the data on the mobile device in association with the one or more activities;
determine to move the shareable data from the primary cloud computing storage to the edge computing cloud storage based on the latency to load the shareable data on the mobile device, wherein the shareable data is usable with the user when the user is at or approaching the location; and
move the shareable data from the primary cloud computing storage to the edge computing cloud storage.

2. The system of claim 1, wherein executing the instructions further causes the system to:
prior to monitoring the one or more activities, request, from the mobile device, a permission to monitor the one or more activities at the location;
receive the permission from the mobile device; and
prevent sharing of activity data monitored from the one or more activities with the primary cloud computing storage prior to a consent from the user.

3. The system of claim 2, wherein monitoring the one or more activities comprises determining at least one of a purchase associated with the location, a movement of the user, a location of interest to the user, a loyalty reward associated with the location, or a usage of the mobile device at or approaching the location, and wherein the shareable data moved to the edge computing cloud storage comprises purchasing information of the user.

4. The system of claim 1, wherein executing the instructions further causes the system to:
predict, using the ML model, a sub-location of interest to the user at the location;
generate an application notification based on the sub-location of interest and a layout of the location, wherein the application notification comprises an interactive map for the location that directs the user to the sub-location and is displayed within a mobile application of the mobile device; and
cause to be output, via the mobile application on the mobile device, the application notification.

5. The system of claim 4, wherein the application notification further comprises location-specific data for the user that is stored on the edge computing cloud storage, and wherein the location-specific data comprises one of loyalty reward information for the location, an image file associated with the location, an audiovisual file associated with the location, media content for the location, or interactive game data for the location.

6. The system of claim 1, wherein executing the instructions further causes the system to:
prior to moving the shareable data, request, from the mobile device, an authentication of the edge computing cloud storage for receipt and storage of the shareable data from the primary cloud computing storage; and
receive, from the mobile device, the authentication.

7. The system of claim 1, wherein the ML model is trained using features associated with past customer behaviors, and wherein the ML model provides a predictive output of an activity of interest to the user based on a current behavior of the user when the user is detected at or approaching the location.

8. A method comprising:
determining, by a service provider via a mobile device of a user, that the user at or approaching a location associated with an edge storage for a distributed data storage system, wherein the edge storage is separate from a primary storage of the distributed data storage system that stores user data for the user;
accessing the user data for the user;
detecting an activity performed by the user when at or approaching the location;
determining a privacy setting for the user data, wherein the privacy setting restricts sharing of different portions of the user data based on the location and a type of the different portions of the user data to share;
determining, using a machine learning (ML) model and based on the detected activity, the user data, and the privacy setting, a portion of the user data for storage by the edge storage, wherein the portion of the user data is usable to provide a service to the user via the edge storage when the user is at or approaching the location, wherein the portion of the user data is stored by the edge storage that reduces a latency to load the portion of the user data to provide the service; and transferring the portion of the user data from the primary storage to the edge storage.

9. The method of claim 8, further comprising:

prior to the detecting, requesting, from the mobile device, a permission to monitor for the activity;

receiving the permission from the mobile device; and preventing sharing of data associated with the activity with the primary storage prior to a consent from the user.

10. The method of claim 8, wherein the activity is associated with one of a purchase associated with the location, a movement of the user, a location of interest to the user, a loyalty reward associated with the location, or a usage of the mobile device at or approaching the location.

11. The method of claim 8, further comprising;

predicting, using the ML model, a sub-location of interest to the user at the location;

generating an application notification based on the sub-location of interest and a layout of the location, wherein the application notification comprises an interactive map for the location that directs the user to the sub-location and is displayed within a mobile application of the mobile device; and causing to be output, via the mobile application on the mobile device, the application notification.

12. The method of claim 11, wherein the application notification further comprises location-specific data for the user that is stored on the edge computing cloud storage, and wherein the location-specific data comprises one of loyalty reward information for the location, an image file associated with the location, an audiovisual file associated with the location, media content for the location, or interactive game data for the location.

13. The method of claim 8, further comprising:

prior to the transferring, requesting, from the mobile device, an authentication of the user for an access to the user data for the transferring; and receiving, from the mobile device, the authentication.

14. The method of claim 8, wherein the ML model is trained using features associated with past customer behaviors, and wherein the ML model provides a predictive output of an activity of interest to the user based on a current behavior of the user when the user is detected at or approaching the location.

15. A non-transitory machine-readable medium having stored thereon machine-readable instructions executable to cause a machine to perform operations comprising:

detecting a geolocation of a user via a mobile device of the user, wherein the mobile device is associated with a cellular network having an edge computing service usable by the user in association with the geolocation;

accessing an edge computing cloud storage for the user that is separate from a main cloud storage utilized by the user;

detecting an activity of the user that is associated with the geolocation;

predicting a user interest of the user based on the detected activity and one or more outputs of a machine learning (ML) model trained based on other user activities associated with the geolocation;

determining a privacy preference of the user for storing activity data associated with the user interest in the edge computing cloud storage, wherein the privacy preference designates allowable storage of the activity data in the edge computing cloud storage to reduce a latency to load the activity data on the mobile device; and storing the activity data associated with the user interest for the user in the edge computing cloud storage independent of storing the data in the main cloud storage based on the privacy preference.

16. The non-transitory machine-readable medium of claim 15, wherein the operations further comprise:

prior to the detecting, requesting, from the mobile device, a permission to monitor for the activity;

receiving the permission from the mobile device; and preventing sharing of the activity data with the main cloud storage prior to a consent from the user.

17. The non-transitory machine-readable medium of claim 15, wherein the activity is associated with one of a purchase associated with the geolocation, a movement of the user, a location of interest to the user, a loyalty reward associated with the geolocation, or a usage of the mobile device at or approaching the geolocation.

18. The non-transitory machine-readable medium of claim 15, wherein the operations further comprise:

predicting, using the ML model, a sub-location of interest to the user at the geolocation;

generating an application notification based on the sub-location of interest and a layout of the geolocation, wherein the application notification comprises an interactive map for the geolocation that directs the user to the sub-location and is displayed within a mobile application of the mobile device; and causing to be output, via the mobile application on the mobile device, the application notification.

19. The non-transitory machine-readable medium of claim 18, wherein the application notification further comprises location-specific data for the user that is stored on the edge computing service, and wherein the location-specific data comprises one of loyalty reward information for the geolocation, an image file associated with the geolocation, an audiovisual file associated with the geolocation, media content for the geolocation, or interactive game data for the geolocation.

20. The non-transitory machine-readable medium of claim 15, wherein the ML model is trained using features associated with past customer behaviors, and wherein the user interest is further predicted based on a current behavior of the user when the user is detected at or approaching the geolocation.

* * * * *